United States Patent Office

3,397,108
Patented Aug. 13, 1968

3,397,108
DEGLOSSED POLYVINYL FLUORIDE
FILM STRUCTURES
James Lee Hecht and Jacob David Polejes, Williamsville,
N.Y., assignors to E. I. du Pont de Nemours and Company, Wilmington, Del., a corporation of Delaware
No Drawing. Filed Feb. 17, 1965, Ser. No. 433,509
11 Claims. (Cl. 161—189)

ABSTRACT OF THE DISCLOSURE

A deglossed polyvinyl fluoride film having substantially high transparency is provided. The polyvinyl fluoride film contains from 1% to 5% by weight, based upon the weight of polyvinyl fluoride, of inert, inorganic particulate material such as silica having a substantially uniform particle diameter of between about 2 and 20 microns, and at least about 0.5% by weight, based upon the weight of polyvinyl fluoride, of a wetting agent such as a phosphate ester.

---

This invention relates to polyvinyl fluoride films and more particularly to deglossed, clear polyvinyl fluoride films having high transparency and to laminates prepared therefrom.

Polyvinyl fluoride film possesses an unusual combination of excellent resistance to outdoor weathering exposures, a high degree of physical toughness, chemical inertness, abrasion resistance, resistance to soiling and the action of solvents as well as an amazing retention of these properties at both low and elevated temperatures. The above combination of properties not only strongly suggest many areas for use of polyvinyl fluoride films, but also the use of such films as outer layers for a wide variety of laminar structures. The polyvinyl fluoride films, serve to upgrade less functional substrates, imparting to the final structure a degree of utility not to be found solely in either film or substrate.

Unpigmented, clear, polyvinyl fluoride films, however, tend normally to exhibit rather high specular gloss with typical films ranging in Gardner gloss rating from 60 to 90 at 60°. There are some film applications such as flexible wall covering laminates which require low gloss, highly transparent polyvinyl fluoride film.

It is, therefore, an object of this invention to provide a deglossed, clear polyvinyl fluoride film having high transparency and to laminates prepared therefrom. These and other objects will appear hereinafter.

The objects of the invention are accomplished by providing a polyvinyl fluoride film containing from about 1% to 5% by weight based on the weight of polyvinyl fluoride, of inert, inorganic particulate material having an average, essentially uniform particle diameter within the range of 2 to 20 microns and a refractive index substantially that of the polyvinyl fluoride; and at least 0.5% by weight, preferably from about 0.5% to 5.0% by weight, based on the weight of polyvinyl fluoride, of a wetting agent for said particulate material which is compatible with the polyvinyl fluoride, said polyvinyl fluoride film having a 60° Gardner gloss rating of no more than 40 and a Delta L value of less than 3.0 NBS units when laminated to a substrate having reference color components of L equal to 45.2 NBS units, $a$ equal to $-8.2$ NBS units and $b$ equal to $-15.0$ NBS units.

The deglossed, clear polyvinyl fluoride films of this invention can be formed by procedures and initial reactants and solvents such as those described in U.S. Patent 2,953,818 combined with the procedures for two-way stretching latent solvent containing polyvinyl fluoride films such as disclosed in U.S. Patent 3,139,470. One method of forming such film comprises feeding a mixture of particulate polyvinyl fluoride, latent solvent, deglossing agent, wetting agent, ultraviolet light absorber compound, if desired, a thermal stabilizer, if desired, and other desired modifiers to a heated extruder of conventional design and provided with a heated casting hopper with lips suitably spaced to form the extrudate passing therebetween into a film of predetermined thickness. The mixture in the extruder is heated to a temperature effective to completely coalesce the polymer particles and form a single phase fluid composition. A tough coalesced extrudate of polyvinyl fluoride film is continuously extruded in self-supporting film form containing latent solvent and then quenched. This film is then preferably heated and stretched in one or more directions while the solvent is volatilized therefrom.

Any convenient arrangement of conventional apparatus can be employed to carry out the film extrusion process, while any convenient technique can be employed in preparing mixtures to be fed to the extruder, a typical preparation is as follows:

All of the particulate polyvinyl fluoride which is to be present in the mixture fed to the extruder is dispersed in a sufficient quantity of latent solvent to provide a fluid homogeneous dispersion which is screened and delivered into a blend tank. All of the deglossing agent and wetting agent is dispersed in an additional portion of the latent solvent until a fluid homogeneous dispersion is also obtained and then is delivered into the first blend tank. To this mixture the thermal stabilizer, the ultraviolet light absorber, and any other desired modifiers are added to the blend tank and blended therein. The blending with the latent solvent can be carried out in a wide variety of mixing equipment including Hobart mixers, and Waring Blendors, ball mills, colloid mills, and sand grinding equipment such as that described in U.S. Patent 2,581,414, etc.

An extrudable composition may be formed containing as little as 15% latent solvent by weight. Depending somewhat on the polymer itself, particles thereof tend to settle out in the range of about 10% by weight of solvents. The preferred solvent concentration range is from 40 to 65%, most preferably about 60%. While the contents of the blend tank are continuously and slowly mixed to maintain the homogeneity, the mixture is then pumped to the extruder.

The feed can also be comprised of finely chipped flakes of recycled polyvinyl fluoride film which can comprise either solvent containing or solvent free polyvinyl fluoride chips. Recycled material may optionally be combined with polymer not previously extruded and/or with fresh latent solvent.

Vinyl fluoride polymer employed in the film of this invention, in addition to homopolymers of vinyl fluoride, includes copolymers of vinyl fluoride with other mono-ethylenically unsaturated monomers copolymerizable therewith, wherein the vinyl fluoride is present in substantial or major amounts, i.e., at least 75% to 80% of the total by weight. Examples are mono-ethylenic hydrocarbons, e.g., ethylene, propylene, isobutylene and styrene; halogen-substituted mono-ethylenic hydrocarbons, e.g., vinyl chloride, vinyl bromide, 1,1-dichloroethylene, 1,1-difluoroethylene, difluorochloroethylene, trifluorochloroethylene, tetrafluoroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate and vinyl esters of inorganic acids; vinyl ethers, e.g., vinyl ethyl ether, tetrafluoroethylallyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, amides, and hydrides and acid halides, including methyl methacrylate, betahydroxyethyl methacrylate, allyl methacrylate, N-butyl methacrylamide, etc.; derivatives of maleic and fumaric acids, e.g., diethyl maleate and dimethyl-fumarate; propenyl esters, e.g., allyl acetate, isopropenyl acetate, etc. Similarly, vinylidene fluoride and copolymers thereof, as well as fluorocarbon polymers generally, can be employed.

From the standpoint of producing a film with optimum property levels, it is preferred to employ a film made from orientable polyvinyl fluoride of as high a molecular weight as possible. Films made from polymer ranging in inherent viscosity as measured at 30° C. in a solution of hexamethylphosphoramide having a polymer concentration of 0.05 g./100 ml. from approximately 0.5 up to greater than 5.0 have been successfully employed. However, polymer ranging in inherent viscosity from 1.0 to 3.5 provides the optimum balance between property levels of finished film and process economies.

The primary requirements of the inert, inorganic particulate material deglossing agent for clear polyvinyl fluoride film are that it must have an average particle diameter of about 2 to 20 microns and it must be contained in the film at a concentration of 1% to 5% by weight. Preferably, the particles are essentially spherical in shape so that uniform low luster is imparted to the film at low weight loadings and particle agglomeration is prevented. The particulate material must have a refractive index substantially that of polyvinyl fluoride (1.45) and preferably should have a low solubility in water. Consideration of the ultimate aesthetic appearance of the film will influence the selection of a given inorganic particulate material and average particle diameter (in the range).

Silica particles meeting the above requirements are particularly advantageous since they are usually free from impurities and, thus avoid light scattering, are readily available, have a refractive index substantially that of polyvinyl fluoride, are less deleterious to basic film properties and provide uniform external roughening without particle appearance. Commercial products which meet the requirements are "Syloid 244" and "Syloid 72," products of the Davison Chemical Division of W. R. Grace and Company.

Other inorganic particulate materials which are inert to the system, have a refractive index substantially that of polyvinyl fluoride and operable in the films of the invention are:

| | |
|---|---|
| Aluminum fluoride ($AlF_3 \cdot H_2O$) | 1.49 |
| Barium fluoride ($BaF_3$) | 1.48 |
| Boron oxide ($B_2O_3$) | 1.45 |
| Calcium fluoride ($CaF_2$) | 1.43 |
| Calcium sulfate | 1.50 |
| Silica (differing crystal structure) | 1.45–1.54 |

It is also necessary to the present invention that the polyvinyl fluoride film preferably contain from 0.5% to 5.0% by weight of a wetting agent for the particulate material which aids in improving transparency, when the film is subsequently laminated to a substrate, by wetting out the particulate material. Any wetting agent can be used and included are wetting agents such as the organic alcohols (alkyl phenoxy polyethoxy ethanols); organo silicones such as a silicon copolymer of the formula:

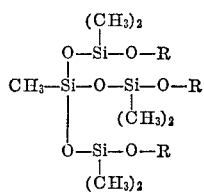

where R is polypropylene-polyethylene oxide; organometallic salts of fatty acids such as, for example, 6V10 manufactured by Ferro Chemical Corp.; phosphates, phosphonates; sulfates; alkyl sulfates and carboxylates. Particularly preferred wetting agents are phosphate esters which are a mixture of phosphate esters of the formula:

$$C_8H_{17}O\overset{O}{\underset{\|}{P}}-(OCH_2CH_2)_2OH \text{ and } (C_8H_{17}O)_2\overset{O}{\underset{\|}{P}}-OCH_2CH_2OH$$

or a mixture of phosphate esters of the formula:

$$RCH_2CH_2O\overset{O}{\underset{\|}{\underset{|}{P}}}-ONH_2(CH_2CH_2OH)_2$$
$$ONH_2(CH_2CH_2OH)_2$$

and $$(RCH_2CH_2O)_2\overset{O}{\underset{\|}{P}}-ONH_2(CH_2CH_2OH)_2$$

where R is alkyl of 6 to 18 carbon atoms.

If desired, other modifiers such as an ultraviolet light absorber compound, a thermal stabilizer, etc. can be added to the film. Any ultraviolet light absorber compound can be employed and included are such compounds as:

(1) 4 or 4'-acrylic esters of 2-hydroxybenzo—and acetophenones in pending U.S. patent application Ser. No. 179,766, filed Mar. 14, 1962, now U.S. Patent No. 3,265,760;

(2) Poly(2-hydroxyaryl) ketones in pending U.S. patent application Ser. No. 378,428, filed June 26, 1964, now U.S. Patent No. 3,324,199;

(3) Polymers of aldehydes/2-hydroxybenzophenone in pending U.S. patent application Ser. No. 376,573, filed June 19, 1964, now U.S. Patent 3,330,884;

(4) Polymers of 4,4' - epoxyalkoxy 2 - hydroxybenzophenone in pending U.S. patent application Ser. No. 368,316, filed May 18, 1964, now abandoned;

(5) Polymers of acrylic esters of salicyloylbenzoylethane in pending U.S. patent application Ser. No. 54,824, filed Sept. 9, 1960, now U.S. Patent No. 3,175,024, all of the above applications in the name of S. Tocker and all assigned to the same assignee as that of the present invention.

Additional illustrative ultraviolet light absorber compounds are:

(1) Polymers of acrylic esters of salicylates disclosed in U.S. Patent 3,113,907;

(2) Polymers of 2'-acrylic esters of 2-hydroxybenzophenone disclosed in U.S. Patent 3,133,042; and commercially available products such as, "Cyasorb" UV 9, "Cyasorb" UV 24 manufactured by American Cyanamid, "Uvinul" 400, "Uvinul" 490, "Uvinul" D-49, "Uvinul" D-50 and "Uvinul" M-40 manufactured by General Aniline and Film Corporation. Operable thermal stabilizers include salts of carboxylic acids, epoxy compounds, organometallic salts and combinations thereof with and without antioxidants, e.g., "Epon" 1004, "Epon" 828 manufactured by Shell Development Corp. and 12V5 manufactured by Ferro Chemical Corp.

Internal haze or transparency of film of the present invention has been improved so that it is now feasible to produce clear, deglossed films acceptable to the trade, particularly films greater than 0.5 mil in thickness.

An outstanding utilization of the film of the present invention is in combination with other materials for flexible wall coverings and siding both for interior and exterior use. This film does not detract from the base requirements and properties, moreover permits their use and is processible in a continuous nip roll laminating operation. For example, a laminate of scrim backed polyvinyl chloride/adhesive/polyvinyl fluoride (embossed) is a practical and satisfactory flexible wall covering. Other substrates include plywood (stained), gypsum board, polyester panels (particularly where a delustered finish is desired). Similarly, a laminate of polyvinyl fluoride/moisture-resistant paper is a practical and satisfactory flexible wall covering.

Polyvinyl fluoride films can be laminated to substrates. Examples of substrates are metal substrates such as cold rolled steel, iron, galvanized iron and steel, aluminum, aluminized steel, chromium, bronze, brass, lead, tin and nickel and various other alloys; glass and other vitreous substrates such as those of porcelain and china; impregnated substrates such as asphalt-impregnated cellulosics; hardboards such as "Masonite"; cement-asbestos boards; wood substrates such as those of birch, oak, fir, pine, hemlock, cedar, redwood, poplar, and ash as well as the plywoods for use as siding and/or roofing for houses and other domestic structures as well as for commercial, industrial and institutional buildings; and polymeric substrates such as those of homopolymers of vinyl chloride and copolymers thereof with, for example, vinylidene chloride, vinyl acetate and fumaric, maleic and acrylic esters, those of regenerated cellulose, those of acrylic esters, those of urea-, melamine- or phenol-formaldehyde resins, and those of vinyl acetates. Laminations to metal and wooden substrates can be employed in the manufacture of outdoor signs, wall tile, wall and ceiling paneling, Venetian blinds, interior partitioning, awnings, ductwood, counter- and table-tops, store fronts, rain gutters and downspouts. Laminations to metal, particularly metals having indicia thereon, can be post-formed and employed to replace enameled and baked wall, ceiling, floor and side members of applications such as refrigerators, freezers, air conditioners, dehumidifiers, hot-water heaters, washers and dryers, kitchen cupboards and cabinets. In the automotive field, laminations of clear and clear/metallized polyvinyl fluoride films to metal substrates can be employed variously as automobile door and side paneling, hard tops, molding, interior and exterior trim, instrument paneling, wheel covers and hub caps, siding and tops for house trailers and truck and van bodies. Prior to lamination, metallic substrates can and usually are given a conventional passivation or corrosion-inhibiting treatment such as that used commercially to prepare substrates for painting. Laminated to coated or uncoated fabrics or to polymeric films, polyvinyl fluoride films can serve as headliners, seat covers, floor mats and trunk liners. Other uses for the laminates of this invention include upholstery, floor coverings, lamp shades and book bindings. Of course, a second layer of polyvinyl fluoride can also be used as substrates.

Any satisfactory adhesive can be used in preparing the laminates: The vinyl addition polymer adhesive and its mixtures with the epoxy compounds and the preparation of each are fully described, respectively, in pending U.S. patent applications Ser. No. 218,102 by H. R. Usala and L. E. Wolinski, now U.S. Patent No. 3,228,823, and Ser. No. 218,103 by H. R. Usala, both filed Aug. 20, 1962, and Ser. No. 415,200 by L. E. Wolinski, filed Dec. 1, 1964, and all are assigned to the same assignee as that of the present invention.

Illustrative of polyester-based adhesives are those polyester and copolyester compositions disclosed in Snyder U.S. Patent 2,623,033; Alles and Saner U.S. Patent 2,698,239; Saner U.S. Patent 2,698,241; and Williams U.S. Patent 2,765,251. Such compositions are usually obtained by reacting a slight stoichiometric excess of ethylene glycol with dimethyl esters of terephthalic, sebacic, isophthalic and/or adipic acids.

Illustrative of acrylic adhesives are those disclosed in Heher and Bauer U.S. Patent 2,464,826; and Blake U.S. Patent 2,949,445; as well as Belgium Patent 610,317.

Illustrative modified adhesives are those disclosed in pending U.S. patent application Ser. No. 379,382 by L. E. Wolinski, filed June 30, 1964, and assigned to the assignee of the present invention, now abandoned.

The effectiveness of the deglossing agent and the wetting agent in film of the present invention is illustrated in the following examples:

Example 1

A blend tank is charged with 64 pounds of N,N-dimethylacetamide, 33 pounds particulate polyvinyl fluoride, 1.4 pounds of the phosphate ester mixture having the formula:

$$C_8H_{17}O\overset{O}{\underset{\|}{P}}-(OCH_2CH_2)_2OH \text{ and } (C_8H_{17}O)_2\overset{O}{\underset{\|}{P}}-OCH_2CH_2OH$$

0.4 pound of a thermal stabilizer, glycidyl polyether ("Epon" 1004)/triphenyl phosphate (4/1 ratio), and 1.4 pounds of particulate spherical silica comprising chiefly particles ranging from 2 to 10 microns in average diameter and having a refractive index of 1.45. This mixture is continuously pumped to a heated extruder connected to a slotted casting hopper 27 inches long with an average lip spacing of 10 mils, from which issued (at about 155° C.) a coalesced latent solvent containing polyvinyl fluoride film which is immediately cooled by conducting it through a water quenched bath maintained at about 15° C. Casting drawn-down was adjusted so that the quench film averaged about 6 mils in thickness. This latent solvent containing film is then continuously stretched first longitudinally 1.4× at 50° C. and then transversely 2.5× at a temperature in the range of 120° C. to 140° C. followed by drying, that is, the volatilization of the remaining dimethylacetamide by exposure for about 13 seconds to an ambient temperature in the range of 170° C. to 190° C. The resulting 0.5 mil thick polyvinyl fluoride film exhibited a Gardner gloss rating of 16 at 60°, and a 1.1 NBS unit change in ΔL when laminated to a substrate having reference color components of L equal to 45.2 NBS, a equal to −8.2 NBS and b equal to −15.0 NBS.

Gardner gloss ratings of film samples in this example and the following examples are measured in accordance with attendant method of test for specular gloss, ASTM designation D523–53T, without applying the diffusion correction (see Section 8 of Method of Test). The apparatus employed for carrying out these measurements in a Model AU–10A gloss meter for automatic photometric unit, in combination with Model UX–5 and 60° gloss head manufactured by Henry A. Gardner Laboratory, Corp., Bethesda, Md. Film samples are mounted on a flat stage and the gloss head placed on the sample so that the incident light beam is aimed in the machine direction of the sample, i.e., the direction of which the film passed through the film manufacturing apparatus.

The definition of the NBS unit and the L, a and b components of color, and calculations thereof, are as found in the following references:

Judd, D. B.—Color in Business, Science and Industry, pages 294 to 296, John Wiley & Sons, New York, 1952.

Hunter, R. S.—Photoelectric Tristimulus Colorimetry With Three Filters, National Bureau of Standards Circ., C429, July 1942.

Federal Specification TT–Page 141b, Test Method 623.1, Paint, Varnish, Lacquer and Related Materials, Methods of Inspection, Sampling and Testing, January 1947.

Values for use in calculations of the components are obtained through the use of a colorimeter manufactured by Manufacturers Engineering and Equipment Corp., Hatboro, Pa., Model IV.

Example 2

An additional series of films is prepared in substantially the manner of Example 1. All films are 0.5 mil in thickness, and contain 4% of the phosphate ester wetting agent and 4% of the silica deglossing agent only the average particular diameter of the silica deglossing agent varied. Table I below shows the effect of particle size on 60° gloss.

TABLE I

| Run | Average Particular Diameter (μ) | 60° Gloss |
|---|---|---|
| 1 | 3.0 | 15 |
| 2 | 4.0 | 17 |
| 3 | 7.0 | 16 |
| 4 | 11.0 | 22 |

Example 3

An additional series of films is prepared in substantially the manner of Example 1. All films are 0.5 mil thick, and contain 4% of the preferred silica deglossing agent having an average particular diameter of 4 microns, only the percentage of the preferred phosphate ester mixture wetting agent varied. Table II shows the effect of wetting agent on transparency (change in ΔL) and gloss.

TABLE II

| Run | Percent Wetting Agent | ΔL(NBS) | 60° Gloss |
| --- | --- | --- | --- |
| 1 | 0 | 3.9 | 17 |
| 2 | 3 | 2.9 | 15 |
| 3 | 4 | 1.1 | 16 |
| 4 | 5 | 0.5 | 17 |

From Table II, it is seen that increasing the wetting agent percentage improves the transparency, i.e., internal haze or internal haze plus one side of the films and has no effect on the gloss. Beyond 5%, no effect on transparency has been observed.

Example 4

A further series of films is prepared in substantially the manner of Example 1. All films are 0.5 mil thick and contained varying amounts of the preferred silica deglossing agent having an average particulate diameter of 4 microns. Table III shows the effect of various amounts of deglossing agent on 60° gloss.

TABLE III

| Run | Percent Deglossing Agent | 60° Gloss |
| --- | --- | --- |
| 1 | 0 | 62 |
| 2 | 1 | 39 |
| 3 | 2 | 33 |
| 4 | 3 | 20 |
| 5 | 4 | 16 |
| 6 | 5 | 12 |

More than about 5% of deglossing agent results in a hazy appearance in which the particles become visible.

Example 5

A 0.5 mil clear, deglossed polyvinyl fluoride film is prepared as in Example 1 which contains 3% of the silica deglossing agent (Syloid 72) and 3% of the phosphate ester mixture wetting agent. As a substrate, 10 mil polyvinyl chloride film is used. It is medium blue in color and has color coordinates L equal to 51.4 NBS units; $a$ equal to 6.7 NBS units and $b$ equal to $-24.9$ NBS units. The polyvinyl fluoride film is laminated to the polyvinyl chloride film using an ammoniated acrylic ester polymer of n-butyl methacrylate (64 wt. percent), methylmethacrylate (32.5 wt. percent) and glycidyl methacrylate (3.5 wt. percent) adhesive prepared according to Example I of Belgium Patent 610,317 to give a dried coating thickness of 0.2 mil. The coated polyvinyl fluoride film is dried at 90° C. for about one minute prior to lamination.

The polyvinyl chloride film is laminated to the adhesive coated polyvinyl fluoride film by heated nip rolls maintained at 350° F., having a nip pressure of 20 p.s.i./linear inch of roll with an effective roll contact of 0.5 inch. The nip rolls operate at a rate of 15 ft./min. In the same operation, cotton scrim is applied to the opposite side of the polyvinyl chloride film to provide a functional backing for adhesion to walls.

| | Gloss | |
| --- | --- | --- |
| | 60° | 85° |
| Polyvinyl fluoride film alone | 24 | 27 |
| Polyvinyl chloride film alone | 47 | 73 |
| PVF over PVC laminate | 21 | 41 |

The color change imparted to the polyvinyl chloride film by the polyvinyl fluoride film is as follows: Delta L equal to $+2.1$; Delta $a$ equal to $-0.1$; and Delta $b$ equal to $+2.6$.

As a control, the same polyvinyl fluoride film as above is prepared except the wetting agent is omitted:

| | Gloss | |
| --- | --- | --- |
| | 60° | 85° |
| Polyvinyl fluoride film alone | 22 | 27 |
| Polyvinyl chloride film alone | 47 | 73 |
| PVF over PVC laminate | 21 | 45 |

The color change imparted to the polyvinyl chloride film by the polyvinyl fluoride film is as follows: Delta L equal to $+4.1$; Delta $a$ equal to $+2.2$; and Delta $b$ equal to $+4.3$.

As a further control, the same polyvinyl fluoride film as above is prepared except both the wetting agent and deglossing agent are omitted.

| | Gloss | |
| --- | --- | --- |
| | 60° | 85° |
| Polyvinyl fluoride film alone | 73 | 93 |
| Polyvinyl chloride film alone | 47 | 73 |
| PVF over PVC laminate | 68 | 98 |

The color change imparted to the polyvinyl chloride film by the polyvinyl fluoride film is as follows: Delta L equal to $-0.2$; Delta $a$ equal to $-0.6$; and Delta $b$ equal to $+0.4$.

In all cases, the polyvinyl chloride substrate is substantially upgraded with respect to cleanability and resistance to various solvents. Solvent type cleaners attack polyvinyl chloride and many soils are strongly adherent to it. It is also seen that only when both the wetting agent and deglossing agent are used in the specified amounts is the film deglossed without a sacrifice in transparency.

What is claimed is:

1. A deglossed polyvinyl fluoride film having substantially high transparency, said film containing from about 1% to 5% by weight, based on the weight of polyvinyl fluoride, of inert, inorganic particulate material having an average, essentially uniform particle diameter within the range of 2 to 20 microns and a refractive index substantially that of the polyvinyl fluoride; and at least about 0.5% by weight, based on the weight of polyvinyl fluoride, of a wetting agent for said particulate material which is compatible with the polyvinyl fluoride.

2. The polyvinyl fluoride film of claim 1 wherein the inert, inorganic particulate material is silica having a refractive index of about 1.45.

3. The polyvinyl fluoride film of claim 1 wherein the inert, inorganic particulate material is selected from the group consisting of aluminum fluoride having a refractive index of about 1.49, barium fluoride having a refractive index of about 1.48, boron oxide having a refractive index of about 1.45, calcium fluoride having a refractive index of about 1.43, calcium sulfate having a refractive index of about 1.50 and silica having a refractive index within the range of about 1.45 to 1.54.

4. The polyvinyl fluoride film of claim 1 wherein there is from about 0.5 to 5.0% by weight of a wetting agent.

5. The polyvinyl fluoride film of claim 1 wherein the wetting agent is a mixture of phosphate esters of the formula:

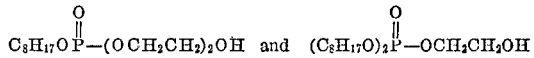

6. A deglossed polyvinyl fluoride film having substantially high transparency, said film containing from about 3% to 5% by weight, based on the weight of polyvinyl fluoride, of substantially spherical silica having an average essentially uniform diameter within the range of 2 to 10 microns and a refractive index of about 1.45; and from about 0.5 to 5.0% by weight, based on the weight of polyvinyl fluoride, of a mixture of phosphate esters of the formula:

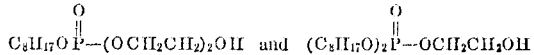

7. The polyvinyl fluoride film of claim 6 additionally containing an ultraviolet light absorber compound.

8. A laminated structure comprising: a substrate and a preformed layer of polyvinyl fluoride film secured to said substrate, said film containing from about 1% to 5% by weight, based on the weight of polyvinyl fluoride, of inert, inorganic particulate material having an average, essentially uniform particle diameter within the range of 2 to 20 microns and a refractive index substantially that of the polyvinyl fluoride; and at least about 0.5% by weight, based on the weight of polyvinyl fluoride, of a wetting agent for said particulate material which is compatible with the polyvinyl fluoride, said polyvinyl fluoride film having a 60° Gardner gloss rating of no more than 40 and a Delta L value of less than 3.0 NBS units when laminated to a substrate having reference color components of L equal to 45.2 NBS units, $a$ equal to $-8.2$ NBS units and $b$ equal to $-15.0$ NBS units and intermediate said substrate and polyvinyl fluoride film an adhesive composition.

9. The laminated structure of claim 8 wherein the substrate is polyvinyl chloride film.

10. The laminated structure of claim 9 wherein the substrate is scrim-backed polyvinyl chloride film.

11. The laminated structure of claim 8 wherein the substrate is wood paneling.

References Cited

UNITED STATES PATENTS

| | | | |
|---|---|---|---|
| 3,326,739 | 6/1967 | Brennan et al. | 161—168 |
| 3,228,823 | 1/1966 | Usala et al. | 161—189 X |
| 3,235,521 | 2/1966 | Pitrot et al. | 260—41 X |

HAROLD ANSHER, *Primary Examiner.*